(12) United States Patent
Ali et al.

(10) Patent No.: US 8,958,856 B2
(45) Date of Patent: Feb. 17, 2015

(54) HOLSTER PROFILE DETECTION VIA ELECTRIC-FIELD PROXIMITY SENSOR TECHNOLOGY

(75) Inventors: Shirook M. Ali, Milton (CA); Christopher Labrador, Waterloo (CA); James Paul Warden, Fort Worth, TX (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/184,190

(22) Filed: Jul. 15, 2011

(65) Prior Publication Data

US 2013/0017814 A1    Jan. 17, 2013

(51) Int. Cl.
*H04W 88/02*        (2009.01)
*G06F 1/16*         (2006.01)

(52) U.S. Cl.
CPC ............ *G06F 1/1626* (2013.01); *G06F 1/1632* (2013.01)
USPC ....................................................... 455/575.1

(58) Field of Classification Search
CPC ..... G06F 1/1626; G06F 1/1628; G06F 1/163; H04B 1/3888; H04M 1/0283
USPC ............ 455/420–421, 41.1, 41.2, 556.1, 574, 455/575.1, 575.6, 575.8
See application file for complete search history.

(56) References Cited

U.S. PATENT DOCUMENTS

| | | | | |
|---|---|---|---|---|
| 6,643,528 | B1 * | 11/2003 | Shim et al. ................. | 455/575.2 |
| 7,471,967 | B2 * | 12/2008 | Kang et al. ................. | 455/575.4 |
| 2002/0004416 | A1 * | 1/2002 | Baratono et al. ............. | 455/569 |
| 2002/0039909 | A1 | 4/2002 | Rankin | |
| 2003/0043037 | A1 * | 3/2003 | Lay ............................ | 340/568.1 |
| 2003/0096641 | A1 * | 5/2003 | Odinak ........................ | 455/569 |
| 2003/0109275 | A1 | 6/2003 | Vander Veen et al. | |
| 2004/0068571 | A1 * | 4/2004 | Ahmavaara ................... | 709/228 |
| 2006/0135216 | A1 * | 6/2006 | Collavo et al. .............. | 455/569.2 |
| 2007/0237101 | A1 * | 10/2007 | Cohen et al. .................. | 370/310 |
| 2008/0005325 | A1 * | 1/2008 | Wynn et al. .................. | 709/225 |
| 2008/0012706 | A1 * | 1/2008 | Mak-Fan et al. ........... | 340/568.1 |
| 2008/0032665 | A1 * | 2/2008 | Bergstrom .................... | 455/403 |
| 2008/0191892 | A1 | 8/2008 | Kirkup et al. | |
| 2009/0092951 | A1 * | 4/2009 | Hou et al. .................... | 434/156 |
| 2009/0325640 | A1 * | 12/2009 | Chava ......................... | 455/556.1 |
| 2010/0033349 | A1 * | 2/2010 | Tsang et al. .................. | 340/935 |
| 2010/0152921 | A1 * | 6/2010 | Urushidani et al. ........... | 701/2 |
| 2010/0248796 | A1 * | 9/2010 | Higashigawa et al. .... | 455/575.4 |
| 2010/0281636 | A1 * | 11/2010 | Ortins et al. ................. | 15/4 |

FOREIGN PATENT DOCUMENTS

| | | |
|---|---|---|
| CA | 2783012 | 1/2013 |
| CN | 1762143 A | 4/2006 |
| CN | 1993894 A | 7/2007 |
| CN | 101924806 A | 12/2010 |
| EP | 2527955 A1 | 11/2012 |
| EP | 2546722 | 1/2013 |
| GB | 2384939 A | 8/2003 |
| WO | 2011133506 A2 | 10/2011 |

OTHER PUBLICATIONS

CIPO, Office Action, Application No. 2,783,012, May 27, 2014, 3 pgs.
SIPO, Second Office Action, Application No. 201210238394.5, Sep. 4, 2014, 2 pgs.
EPO, Extended European Search Report, Application No. 12175683.7, Nov. 24, 2014, 10 pgs.

\* cited by examiner

*Primary Examiner* — Diane Mizrahi
(74) *Attorney, Agent, or Firm* — The Danamraj Law Group, P.C.

(57) ABSTRACT

A mobile electronic device is used with a case and contains a processor, at least one electric-field proximity detector adapted to detect a non-magnetic proximity activator in the case and a component configured to effect setting a state indicator in a device profile in dependence on an output from the at least one electric-field proximity detector.

15 Claims, 3 Drawing Sheets

HOLSTER PROFILE DETECTION VIA ELECTRIC-FIELD PROXIMITY SENSOR TECHNOLOGY

TECHNICAL FIELD

The present disclosure relates to portable handheld electronic devices used with a holster, case or other enclosure and to the operation of the device when holstered or holstering. More particularly, the disclosure relates to a method for determining the state of the mobile electronic device in relation to an associated case and to a mobile electronic device and case operable with such a method.

BACKGROUND

With mobile electronic devices, such as a wireless communication device, it is common and convenient to provide a case to protect and conveniently transport the electronic device when the electronic device is not in use. However, the mobile electronic devices typically have keyboards, trackballs, touch pads, switches or other such elements, and it is desirable to be able to place the mobile electronic device in the case without having to turn it off, yet avoid triggering of these elements when contacted by the case. It is known to have a permanent magnet in the case, with a Hall effect sensor that detects the magnetic field in the mobile electronic device, so that in response to the device being placed in the case and the sensor aligning with the magnet, at least certain functions are disabled. For example, it is common to disable the keyboard, lock the device, disable the trackball or other input means and turn off any display.

BRIEF DESCRIPTION OF THE PREFERRED EMBODIMENTS

For a more complete understanding of the features and advantages of the present methods, radio access networks and mobile user equipment (UE) devices, reference is now made to the detailed description along with the accompanying figures in which corresponding numerals in the different figures refer to corresponding parts and in which.

DETAILED DESCRIPTION OF THE DRAWINGS

Figure 1A:
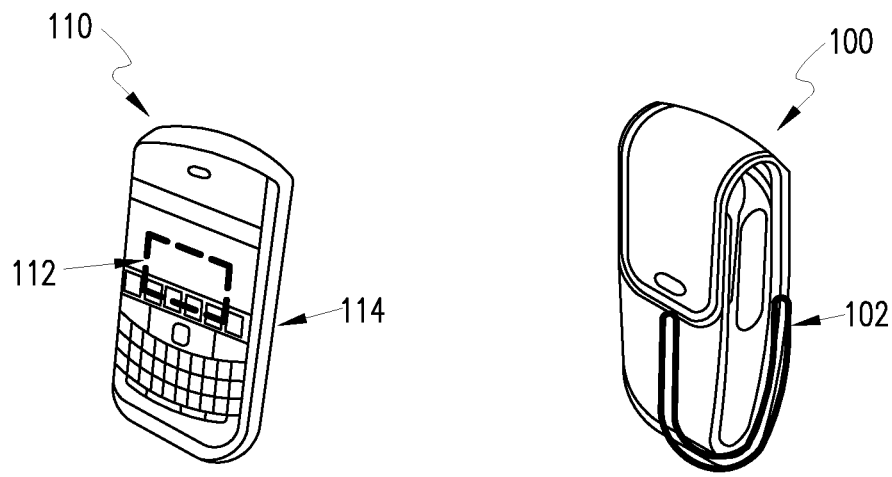
FIG. 1A is a diagram depicting a mobile electronic device and case for setting a state of the mobile electronic device with respect to the case according to an embodiment of the disclosure.

The present patent disclosure is broadly directed to setting the state of a mobile electronic device to reflect whether the mobile electronic device is in-case or out-of-case. The state of the mobile electronic device with respect to an associated case can be stored in a state indicator that is part of the device profile and can be used to control specific functions of the mobile electronic device, such as whether input and output devices are active, whether the device is locked, etc. The state of the mobile electronic device can also reflect that the mobile electronic device is in transit between the in-case and out-of-case states or that the mobile electronic device is in some stable position with regard to the case. Related thereto, also described is a mobile electronic device operable with a case and a case for use with a mobile electronic device having electric-field proximity detectors. In the context of the present patent application, a "case" is defined as any container, enclosure or protective device for use with a mobile electronic device. Accordingly, a case can refer to a holster having a belt clip to attach it to a user's belt or other attachment means for attachment to a purse or knapsack. A case as used herein can also be a protective cover or shell that partially or totally encloses the mobile electronic device and that may or may not include attachment means. For the purpose of this application, a case can also be a pocket or enclosure that is part of a larger device such as a purse or briefcase.

In one embodiment of the disclosure, a mobile electronic device operable with a case comprises a processor, at least one electric-field proximity detector adapted to detect a proximity activator in a case intended for use with the mobile electronic device, the proximity activator being non-magnetic and a component configured to effect setting a state indicator in a device profile in dependence on an output from the at least one electric-field proximity detector.

In one embodiment of the disclosure, a case for use with a mobile electronic device comprises a shell at least partially enclosing the mobile electronic device and at least one proximity activator attached to the shell and operable to trigger a electric-field proximity detector on the mobile electronic device, the at least one proximity activator being non-magnetic.

In one embodiment of the disclosure, a method for operating a mobile electronic device comprises determining which proximity detectors of a plurality of electric-field proximity detectors in the mobile electronic device detect the presence of a respective proximity activator of a plurality of proximity activators in a case associated with the mobile electronic device, and setting a state indicator to one of a plurality of states in dependence on the determining, wherein when none of the plurality of electric-field proximity detectors detect the presence of the respective proximity activator, setting the state indicator to a first state, when at least one, but not all, of the plurality of electric-field proximity detectors detects the presence of the respective proximity activator, setting the state indicator to a second state, and when all of the plurality of electric-field proximity detectors detects the presence of the respective proximity activator, setting the state indicator to a third state.

A mobile electronic device, case and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. For the purpose of this application, two elements are used to determine whether the mobile electronic device is in the case: an electric-field proximity detector and a proximity activator to which the detector is sensitive; various combinations of proximity detectors and proximity activators will be discussed. Where the description discusses a relative position of elements, such as one being above or below another, the relationship is used merely for ease of reference in describing the embodiments illustrated in the drawings and is not meant as a limitation of the claimed embodiments.

Referring now to the drawings, and more particularly to FIG. 1A, an embodiment of a mobile electronic device 110 and case 100 are shown. In this embodiment, two electric-field proximity sensors 112, 114 are placed at separate locations on the wireless UE device, with a first proximity sensor acting as a transmitter and a second proximity sensor acting as a receiver. Together electric-field proximity sensors 112, 114 form the electric-field proximity detector, while metallic strip 102 built into the case or placed adjacent to the case's inner material is the proximity activator and provides a conductive path between the two electric-field sensors when the mobile electronic device is placed in the case. For the purpose of this disclosure, a metallic element can be a strip of metal, e.g., copper, an alloy, or any composition of material that has a high conductivity. The conductivity of the metallic element should be detectably greater than the conductivity of the human body to avoid an accidental triggering of the sensors when the user contacts the proximity sensors during use. In one embodiment the metallic strip is at least twice as conductive as the human body, although the necessary difference in conductivity is dependent on the discriminative capability of the sensors used. In the embodiment illustrated, electric-field proximity sensor 112 is a transparent electrode placed on the screen of mobile electronic device 110. A second electric-field proximity sensor is positioned on the back side of the mobile electronic device, e.g. on the door of the battery compartment, with the position pointed to by arrow 114. In another embodiment, electric-field proximity sensors 112, 114 can be positioned at other locations on or under the housing of mobile electronic device 110. In at least one embodiment, electric-field proximity sensor 112 is the transmitter and electric-field proximity sensor 114 is the receiver; in at least one embodiment, these functions are reversed. Although not specifically shown in this figure, electric-field proximity sensors 112 and 144 are electrically connected within mobile electronic device 110.

Case 100 can be of any convenient design that provides some amount of protection to the mobile electronic device. Conductive strip 102 is attached to case 100 such that conductive strip 102 aligns with proximity sensors 112, 114 when mobile electronic device 110 is placed in case 100, completing a closed loop between proximity sensors 112, 114. A logic module within mobile electronic device 110 is programmed to control a simple state machine based on the input from electric-field proximity detectors 112, 114. When the loop between electric-field proximity detectors 112, 114 is closed by proximity activator 102, the logic module sets an in-case state for the UE device. While the specific settings used in the in-case state are not part of the present disclosure, the settings can include locking the device and disabling input devices, e.g., keyboard, touchpads/touchscreens, etc., and turning off the display. The logic module sets an out-of-case state once the closed loop between the sensors is broken. The settings for the out-of-case state can include enabling each of the elements previously disabled by the in-case state.

Figure 1B:
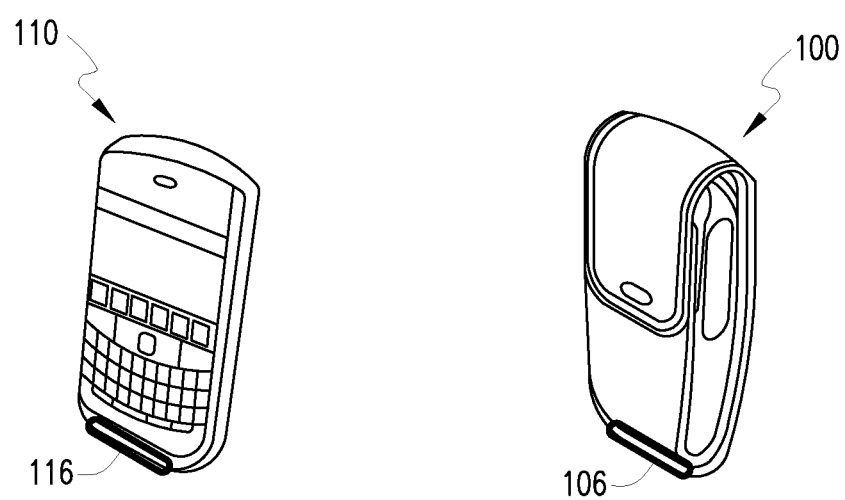
FIG. 1B is a diagram depicting a mobile electronic device and case for setting a state of the mobile electronic device with respect to the case according to an embodiment of the disclosure.

Referring now to FIG. 1B, an alternate embodiment of the disclosure is shown. In this embodiment, rather than using two sensors and creating a closed loop between the sensors for detection, mobile electronic device 110 contains a single electric-field sensor as electric-field proximity detector 116, while case 100 includes a metallic element as corresponding proximity activator 106, with proximity activator 106 causing a change in the electric-field around electric-field proximity detector 116. When electric-field proximity detector 106 detects the presence of activator 116, the state is set to in-case; when electric-field proximity detector 106 is no longer able to detect activator 116, the state is set to out-of-case. The embodiment of FIG. 1B can also be implemented based on reading a barcode tag, RFID tag or other similar technology to activate an in-case state. To implement one of these alternate embodiments, a barcode or an RFID tag is placed in the case as proximity activator 106. An appropriate reader for the barcode or RFID tag is implemented as electric-field proximity detector 116 in mobile electronic device 110 and positioned so that the reader aligns with the barcode or RFID tag when the mobile electronic device is placed in the case. When the reader detects the proximity of the RFID tag or barcode tag, a signal is initiated, causing the logic module to set an in-case state. In this embodiment, the reader is activated periodically, e.g. and not limited to, every 5 seconds, to determine whether the UE device is in-case. If the reader does not "see" the RFID tag or barcode tag, then an out-of-case state is set. Because of a possible time lag between removal of the mobile electronic device and determining that the electric-field proximity detector can no longer detect the activator, when the device state is in-case, mobile electronic device 110 can also be configured to trigger the reader in response to input to the screen or keyboard, allowing the electronic device to distinguish between an accidental triggering while in the case and intentional user input. As shown in FIG. 1B, electric-field proximity detector 116 is positioned on a lower edge of mobile electronic device 110 and proximity activator 106 is positioned at a corresponding position in case 100. One skilled in the art would understand that these devices can be positioned at a multitude of other corresponding locations on the mobile electronic device and case. Although the above embodiments are described as having electric-field proximity detector 116 located on mobile electronic device 110 and proximity activator 106 located in case 100, it is also possible to reverse this order, with electric-field proximity detector 116 in case 100 and proximity activator 106 located on mobile electronic device 110. Because the detection in this alternate embodiment occurs in case 100, a short-range transmitter (not specifically shown) can be incorporated into case 100 to broadcast results to mobile electronic device 110.

Figure 2A:
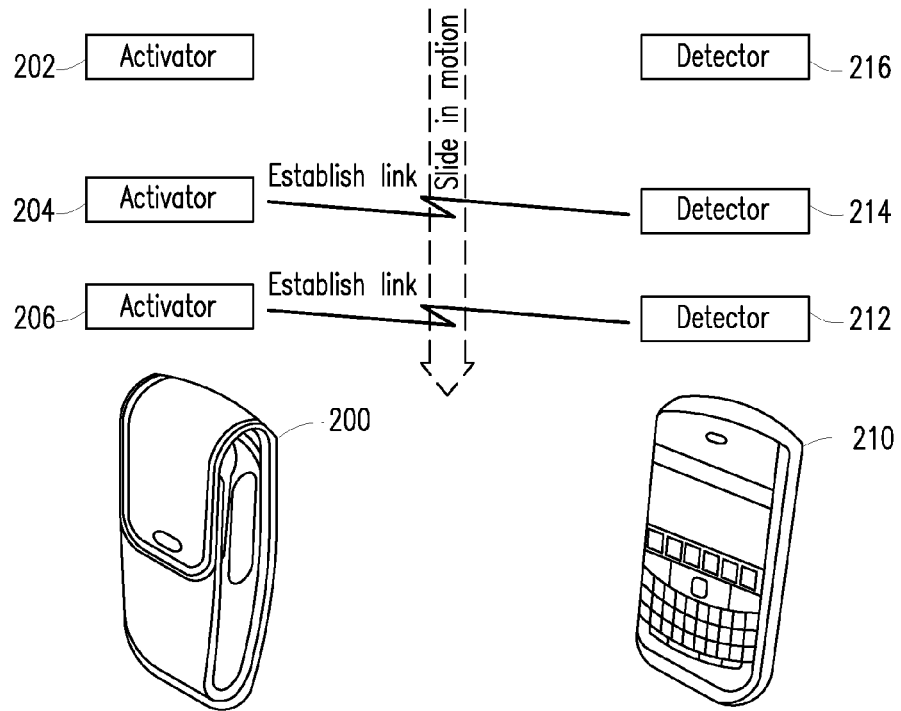
FIG. 2A is a diagram depicting a method operable with a mobile electronic device for setting a state of the mobile electronic device with respect to the case according to an embodiment of the disclosure.
Figure 2B:
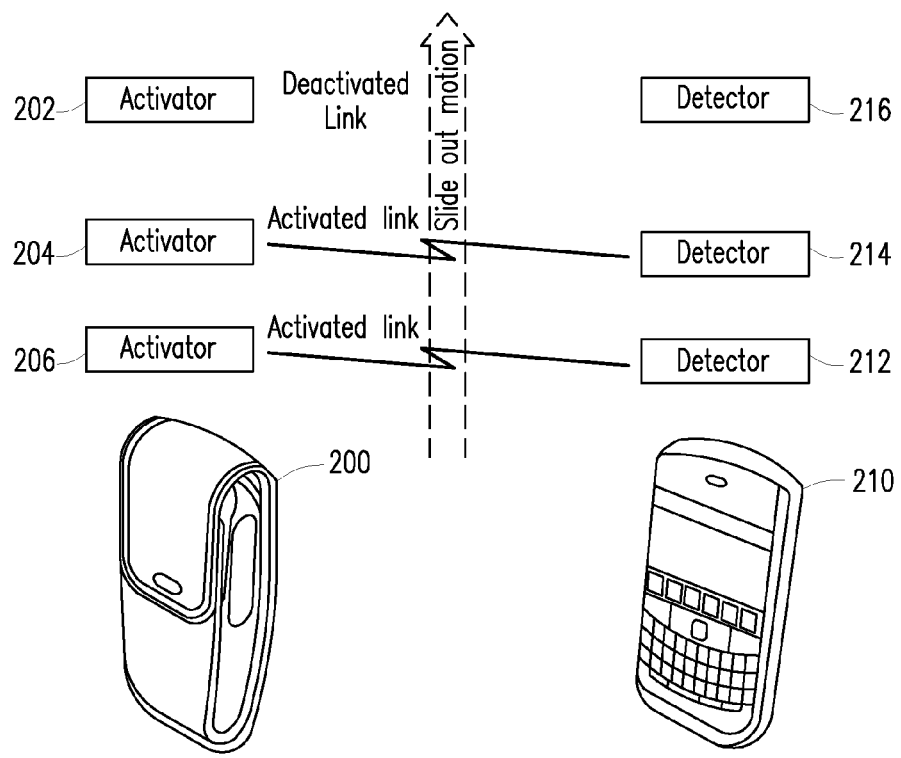
FIG. 2B is a diagram depicting a method operable with a mobile electronic device for setting a state of the mobile electronic device with respect to the case according to an embodiment of the disclosure.

Turning now to FIGS. 2A and 2B, the embodiments shown are based on a multi-step sensing algorithm that is activated as the mobile electronic device is inserted into or removed from the case. The electric-field proximity detector and corresponding proximity activator in these embodiments can be any of the detector/activator pairs used in the previous embodiments, e.g., a proximity sensor used with a metallic element, an RFID reader with an RFID tag, a barcode reader with a barcode tag, or any other detector and activator combination that can provide the disclosed functionality. With reference to FIG. 2A, case 200 contains a number of proximity activators 202, 204, 206 that are positioned to be detected by electric-field proximity detectors 212, 214, 216 in mobile electronic device 210. Although these figures do not identify specific locations on case 200 and mobile electronic device 210 for the proximity activators and electric-field proximity detectors, it should be clear from the drawings that with appropriate placement of detectors 212, 214, 216 and activators 202, 204, 206, as mobile electronic device 210 slides into case 200, electric-field proximity detector 212 will detect in turn activator 202 and 204, then come to rest in a position that detects activator 206. Thus the direction of motion of the electronic device within the case is detected. Similarly, detector 214 will first detect activator 202, then come to rest in a position that detects activator 204 and detector 216 will come to rest in a position that detects activator 202. As mobile electronic device 210 is being slid into case 200, a counter is used to determine the number of electric-field proximity detectors that have detected a respective proximity activator. Once all electric-field proximity detectors have detected a respective proximity activator, mobile device 210 sets the state to in-case and executes an in-case mode, e.g., the device is locked, the display is turned off, etc. In addition, once any electric-field proximity detector on mobile device 210 enters case 200 and detects a proximity activator, the state can be set to an in-transit state in which input devices are disabled for a short period, e.g., a second, to prevent an inadvertent entry from contact with the case. In at least some embodiments, the in-transit state is designed to be a transitory state that must either progress to a next state within a specific time period or the state will revert to the previous state. In one embodiment in which the presence detectors are equally spaced from each other and the presence activators are also equally spaced, as mobile device 210 is being slid into case 200, electric-field proximity detector 212 detects proximity activator 202. In response, a counter is set to 1, the state is set to in-transit and input devices are disabled for a short period of time while the algorithm determines whether the mobile device will be fully placed in the case. As mobile electronic device 210 continues into case 200, electric-field proximity detector 212 detects proximity activator 204 and electric-field proximity detector 214 detects proximity activator 202. At this point, the counter is incremented by 1 and the state remains in-transit. Finally, electric-field proximity detector 212 detects proximity activator 206, electric-field proximity detector 214 detects proximity activator 204 and electric-field proximity detector 216 detects proximity activator 202. The counter is incremented again. Once the mobile electronic device determines that all of the electric-field proximity detectors have detected a respective proximity activator, the state of mobile electronic device 210 is set to in-case and the in-case mode is used. In at least one embodiment, if mobile electronic device 210 is partially inserted, but withdrawn before fully seating the mobile device in the case, the in-transit state will revert to its previous state when the time period expires.

The method described above is a very simple example and should not be taken as defining the scope of possible methods. For example, although only three presence detector/activator pairs are discussed, the number of presence detectors and presence activators is not limited, as will be discussed further below. Additionally, although the description above is of an embodiment in which one presence detector, e.g. 212, can sequentially detect each of the presence activators, e.g., 202, 204, 206, this is not necessary to the featured method, as placement of detectors and activators can be varied to accommodate different scenarios. As noted, above, the direction of travel of the mobile electronic device can be determined. If desired, the state can reflect whether the mobile electronic device is in transit into the case or in transit out of the case. Additionally, rather than the in-transit state being temporary, the in-transit state can be a stable state and can be divided into sub-states that reflect how far into the case the mobile electronic device has moved or the position of the mobile electronic device. Additionally, the case can provide more than simple protection and can contain logic that can be executed when the mobile electronic device is in a predetermined position. In such an embodiment, mobile electronic device 210 can provide the state to the case for use therein. Alternatively, presence detectors 212, 214, 216 can be placed in the case and presence activators 202, 204, 206 can be placed in the mobile electronic device. In this embodiment, the case may perform the detection and provide the mobile electronic device with a value of the state.

With reference next to FIG. 2B, an embodiment is illustrated of mobile electronic device 210 being removed from case 200. The sequence of events in one embodiment follows. Initially, presence detector 212 detects presence activator 206, presence detector 214 detects presence activator 204, and presence detector 216 detects presence activator 202. As mobile device 210 is being slid out of case 200, a counter is again used to determine the number of electric-field proximity detectors that are no longer able to detect a corresponding proximity activator. Once none of the electric-field proximity detectors can detect a corresponding proximity activator, mobile device 210 sets the state to out-of-case and executes an out-of-case mode, e.g., the display is activated and input devices are enabled. If desired, once any electric-field proximity detector on mobile device 210 is no longer able to detect a corresponding proximity activator, the state can be set to in-transit, indicating that the mobile device is being removed from the case. As in the previous example, the in-transit state can be a transitory state in which input devices remain disabled but the device can begin a transition to an out-of-case state with the expectation that full transition between the in-case and out-of-case state will occur within the short period of time. As mobile electronic device 210 is removed from the case, detector 216 is the first presence detector to lose contact with the presence activators while presence detector 214 loses contact with presence activator 204, but gains contact with activator 202 and presence detector 212 loses contact with presence activator 206 but gains contact with activator 204. In response, a counter is set to 1. As mobile electronic device 210 continues to slide out of case 200, electric-field proximity detector 214 loses contact with proximity activator 202 and electric-field proximity detector 212 loses contact with activator 204 but gains contact with activator 202. The counter is incremented by 1 and the in-transit state continues. Finally, electric-field proximity detector 212 loses contact with proximity activator 202 and the counter is incremented again. Once the mobile electronic device determines that all of the electric-field proximity detectors have lost contact with respective proximity activators, the state of mobile electronic device 210 is set to out-of-case and the out-of-case mode are used. In at least one embodiment, if mobile electronic device 210 is partially withdrawn, but remains in the case, the in-transit state will revert to its previous in-case state when the time period expires.

It will be understood that the variations discussed above with regard to FIG. 2A also apply to FIG. 2B. Additionally, one skilled in the art will understand that the number of proximity activators and electric-field proximity detectors can be as few as one or as many as will practically fit onto the mobile electronic device, depending on the particular embodiment. For example, rather than using three metallic elements for proximity activators 202, 204, 206, a single metallic strip can be used instead. With appropriate positioning of electric-field proximity detectors 212, 214, 216, each of these detectors in turn can detect and remain in range of the metallic strip while in the case. In another embodiment, a single activator 202 is positioned near the upper end of case 200; as mobile electronic device 210 is placed in the case, each of detectors 212, 214, 216 in turn detects activator 202, but only detector 216 will continue to detect the activator in an in-case position. In a further embodiment, a single electric-field proximity detector 212 is positioned near a lower edge of mobile electronic device 210, while proximity activators 202, 204, 206 are appropriately positioned in case 200. As mobile electronic device 210 is inserted into case 200, electric-field proximity detector 212 detects each of activators 202, 204, 206 in turn, but will continue to detect only activator 206 during an in-case state. One skilled in the art will be able to devise other arrangements of detectors and activators that can detect the passage of mobile electronic device 210 into and out of case 200.

Proximity sensors are also used in mobile electronic devices to detect a closed loop formed between the sensors and the human hand or head. To address the possibility that the mobile electronic device could set an in-case state while in the user's hand or near the face, a test was performed to determine whether such an accidental triggering of the in-case state can be prevented. A mock mobile electronic device having a proximity sensor placed near the lower end of the mock device was used, similar to the location of electric-field proximity detector 116 shown in FIG. 1B. A copper strip was used to measure the detection range "D" that would set the sensor on; the reading came to D=22 mm. The same range measurement was repeated using an actual human hand; the reading then came to D=11 mm. It is evident that the detection range and time with the copper strip is almost half that with the hand. The results can be understood knowing that the conductivity of the copper strip is $5.96 \times 10^7$ Siemens/meter, while the conductivity of human tissue at 1880 MHz is 1.4 Siemens/meter. Therefore, the placement and the sensitivity range of the electric-field proximity detectors can be adjusted to recognize the required sensing objective, i.e., a metallic element rather than a human body part.

Figure 3:
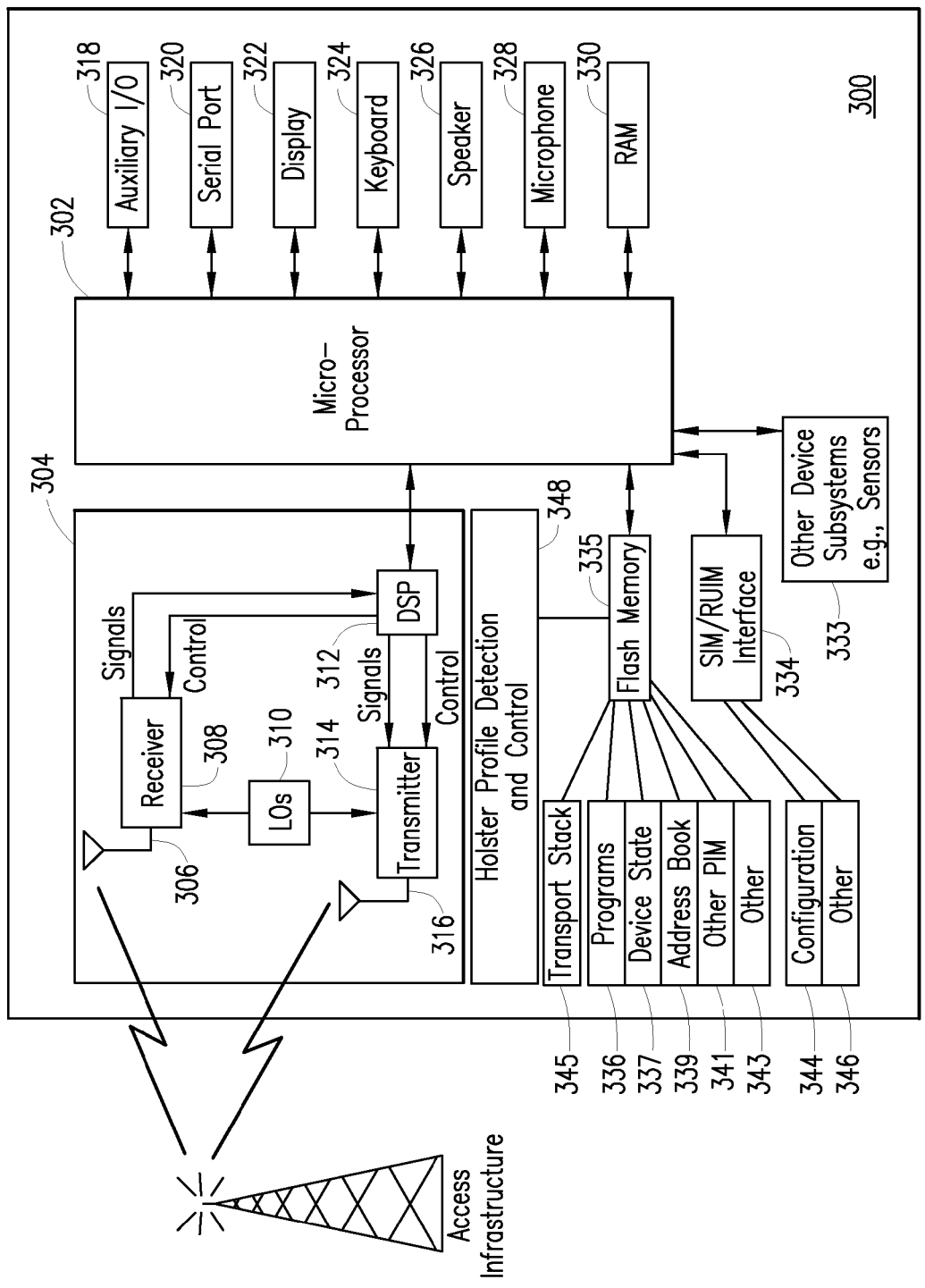
FIG. 3 is a diagram depicting a mobile electronic device according to an embodiment of the disclosure.

FIG. 3 depicts a block diagram of an example mobile electronic device (e.g., mobile communication device 210) according to an embodiment that includes appropriate functionality to set the case state as described hereinabove. A microprocessor 302 providing for the overall control of an embodiment of mobile electronic device 300 is operably coupled to a communication subsystem 304 that includes a receiver 308 and transmitter 314 as well as associated components such as one or more local oscillator (LO) modules 310 and a processing module such as a digital signal processor (DSP) 312. As will be apparent to those skilled in the field of communications, the particular design of the communication module 304 may be dependent upon the communications network with which the mobile device is intended to operate. In one embodiment, the communication module 304 is operable with both voice and data communications. Regardless of the particular design, however, signals received by antenna 306 from a base station 307 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, and any other device subsystems such as proximity sensors generally labeled as reference numeral 333. To control access as well as supply the initial configuration, a Subscriber Identity Module (SIM) or Removable user Identity Module (RUIM) interface 334 is also provided in communication with the microprocessor 302. In one implementation, SIM/RUIM interface 334 is operable with a SIM/RUIM card having a number of key configurations 344 and other information 346 such as identification, DM configuration and subscriber-related data.

Operating system software and transport stack software may be embodied in a persistent storage module 335 (i.e., non-volatile storage) which may be implemented using Flash memory or another appropriate memory. In one implementation, persistent storage module 335 may be segregated into different areas, e.g., storage area for computer programs 336 (which may include operation system software) and transport stack 338, as well as data storage regions such as device state 337, address book 339, other personal information manager (PIM) data 341, and other data storage areas generally labeled as reference numeral 343. Additionally, device profile detection and control module 348 is provided for detecting whether the mobile electronic device is in-case or out-of-case according to the teachings set forth hereinabove. Device profile detection and control module 348 can be implemented in software, hardware or any combination of software and hardware.

It will be recognized by those skilled in the art upon reference hereto that although embodiments of this disclosure may comprise a mobile electronic device and case as shown in the disclosed figures, there can be a number of variations and modifications with respect to the various elements depicted. Accordingly, the arrangements shown in these figures should be taken as illustrative rather than limiting with respect to the embodiments of the present patent disclosure. Various modifications and combinations of the illustrative embodiments, as well as other embodiments, will be apparent to persons skilled in the art upon reference to the description. It is, therefore, intended that the appended claims encompass any such modifications or embodiments.

The invention claimed is:

1. A mobile electronic device operable to be placed inside a portable case, the mobile electronic device comprising:
   a processor operably coupled to an input device;
   a plurality of electric-field proximity detectors adapted to recognize at least one metallic proximity activator in a portable case that at least partially encloses the mobile electronic device, the at least one proximity activator being non-magnetic; and
   a component configured to effect setting a state indicator in a device profile in dependence on an output from the plurality of electric-field proximity detectors, wherein when none of the plurality of proximity detectors detect the presence of the respective proximity activator, setting the state indicator to a first state,
   when at least one, but not all, of the plurality of proximity detectors detects the presence of the respective proximity activator, setting the state indicator to a second state, and
   when all of the plurality of proximity detectors detects the presence of the respective proximity activator, setting the state indicator to a third state, said first, second and third states being different from each other.

2. The mobile electronic device of claim 1 wherein the component configured to effect setting the state indicator sets the state indicator in the mobile electronic device.

3. The mobile electronic device of claim 1 wherein the component configured to set the state indicator is operable to set the state indicator to in-case when all of the plurality of proximity detectors detects the presence of the at least one proximity activator and to set the state indicator to out-of-case when none of the proximity detectors detects the presence of the at least one proximity activator.

4. The mobile electronic device of claim 3 wherein the component configured to set the state indicator is further operable to set the state indicator to in-transit when some, but not all of the proximity detectors detects the presence of the at least one proximity activator.

5. The mobile electronic device of claim 4 wherein the at least one proximity activator comprises a strip of metal that can be detected by all of the plurality of proximity detectors when the mobile electronic device is in seated in the portable case.

6. The mobile electronic device of claim 4 wherein the at least one proximity activator comprises a respective metallic proximity activator that aligns with each the plurality of proximity detectors when the mobile electronic device is in seated in the portable case.

7. The mobile electronic device of claim 1 wherein at least one of the plurality of states indicates a direction of travel of the mobile electronic device with regard to the case.

8. The mobile electronic device of claim 1 further comprising determining an order in which the plurality of presence detectors are activated and deactivated.

9. A method for operating a mobile electronic device, comprising:
   determining which proximity detectors of a plurality of proximity detectors in the mobile electronic device detect the presence of a respective proximity activator of a plurality of proximity activators in a case associated with the mobile electronic device; and
   setting a state indicator to one of a plurality of states in dependence on the determining, wherein
   when none of the plurality of proximity detectors detect the presence of the respective proximity activator, setting the state indicator to a first state,
   when at least one, but not all, of the plurality of proximity detectors detects the presence of the respective proximity activator, setting the state indicator to a second state, and
   when all of the plurality of proximity detectors detects the presence of the respective proximity activator, setting the state indicator to a third state, said first, second and third states being different from each other.

10. The method of claim 9, wherein the state indicator is set to the first state to indicate an out-of-holster mode, the indicator is set to the second state to indicate an in-transit mode and the indicator is set to the third state to indicate in-holster mode.

11. The method of claim 9, wherein the state indicator is set in a device profile in the mobile electronic device.

12. The method of claim 9, wherein the state indicator is set in a device profile in the case.

13. The method of claim 9, wherein at least one of the plurality of states indicates a direction of travel of the mobile electronic device with regard to the case.

14. The method of claim 9, further comprising determining an order in which the plurality of presence detectors are activated and deactivated.

15. The method of claim 9, further comprising disabling the input device when the state of the state indicator is set to in-case.

\* \* \* \* \*